United States Patent [19]

Miller

[11] 4,232,093

[45] Nov. 4, 1980

[54] HIGH TEMPERATURE SKIN CONSTRUCTION

[75] Inventor: Robert C. Miller, Encino, Calif.

[73] Assignee: Summa Corporation, Culver City, Calif.

[21] Appl. No.: 410,691

[22] Filed: Oct. 29, 1973

[51] Int. Cl.$^3$ ............................................. B21C 37/00
[52] U.S. Cl. ................................. 428/591; 428/594; 428/606; 428/608; 244/123
[58] Field of Search ...................... 29/183, 183.5, 191, 29/191.4, 191.6, 180 SS; 52/618, 84; 428/591, 594, 608, 606; 244/123

[56] References Cited

U.S. PATENT DOCUMENTS

| | | | |
|---|---|---|---|
| 1,553,695 | 9/1925 | Junkers | 29/180 SS UX |
| 1,616,968 | 2/1927 | Hall | 29/180 SS UX |
| 2,132,642 | 10/1938 | Parsons | 52/618 X |
| 2,406,815 | 9/1946 | Elfving | 52/618 X |
| 2,608,500 | 8/1952 | Del Mar et al. | 52/618 |
| 3,195,841 | 7/1965 | Krohn | 52/618 X |
| 3,217,845 | 11/1965 | Reynolds et al. | 29/191 |
| 3,341,395 | 9/1967 | Weber | 52/618 X |
| 3,465,420 | 9/1969 | Webb et al. | 29/191 X |
| 3,764,277 | 10/1973 | Hollis | 29/191.6 |

FOREIGN PATENT DOCUMENTS

| | | | |
|---|---|---|---|
| 750096 | 1/1967 | Canada | 52/618 |
| 577705 | 5/1946 | United Kingdom | 52/84 |

*Primary Examiner*—Paul F. Shaver
*Attorney, Agent, or Firm*—Smyth, Pavitt, Siegemund, Jones & Martella

[57] ABSTRACT

A skin construction suitable for use as a high temperature airfoil surface that includes a metallic member having first and second corrugations. The first corrugations have a size and spacing which permits resilient thermal expansion of the member in a direction transverse to the direction of the first corrugations. The second corrugations are positioned in a direction that is substantially transverse to the direction of the first corrugations and the second corrugations have a size and spacing which permits resilient thermal expansion of the member in a direction generally transverse to the direction of the second corrugations.

An imperforate metallic surface is integral with the metallic member. Thermal stresses imposed on the skin construction are, thus, absorbed by deformation of the first and second corrugations which act as expansion joints in permitting controlled expansion of the skin construction.

In combination, a skin construction, as described, and a support structure for positioning the skin construction in spaced relation to an underlying structure. The upstanding metallic support members are connected to a surface of the metallic member of the skin construction with the support members including a corrugated upstanding surface.

In combination, a high temperature skin construction and a support structure, both as described, and an underlying structure with the skin construction supported in spaced relation to the underlying structure. Insulation is placed in the space between the skin construction and the underlying structure. The combination may include means to vent the space between the skin construction and the underlying structure to ambient pressure.

60 Claims, 23 Drawing Figures

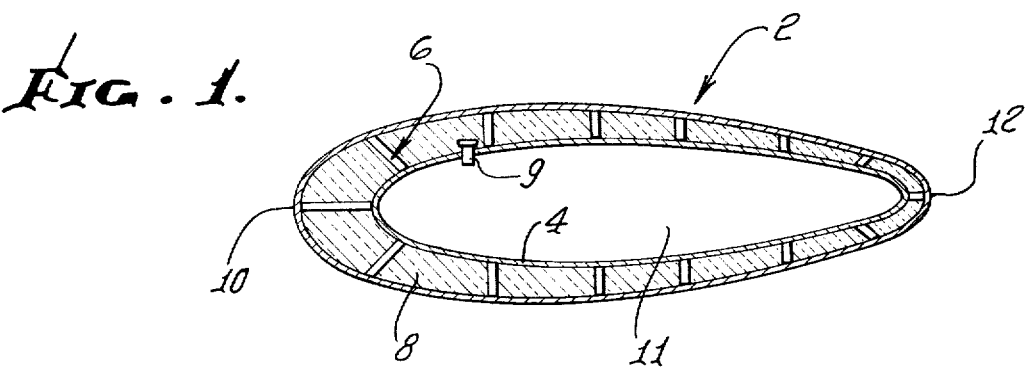
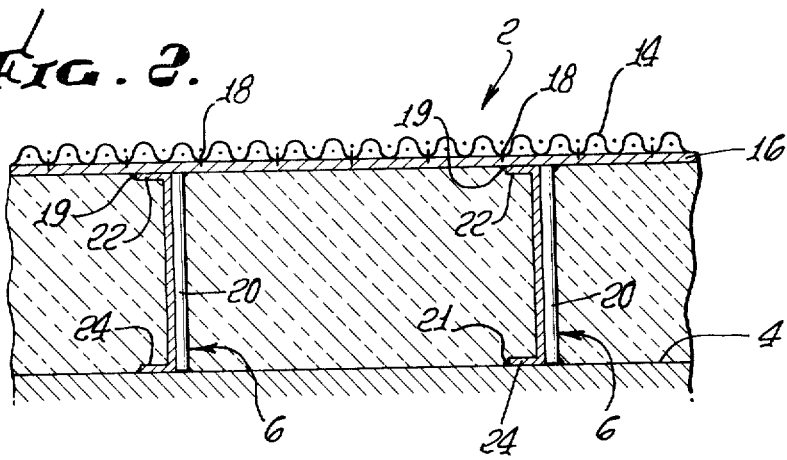
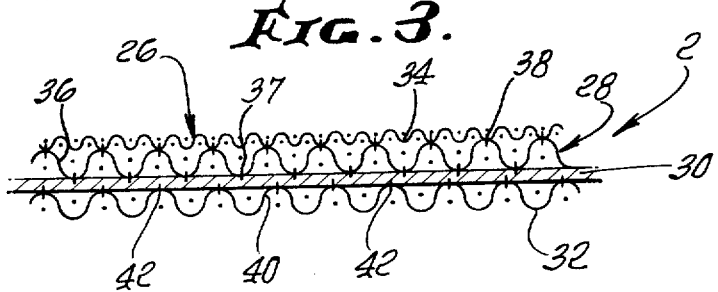
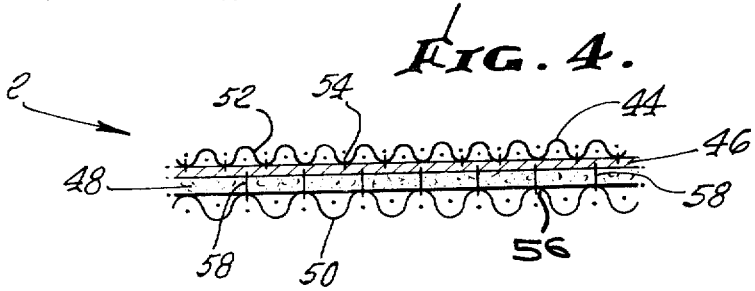

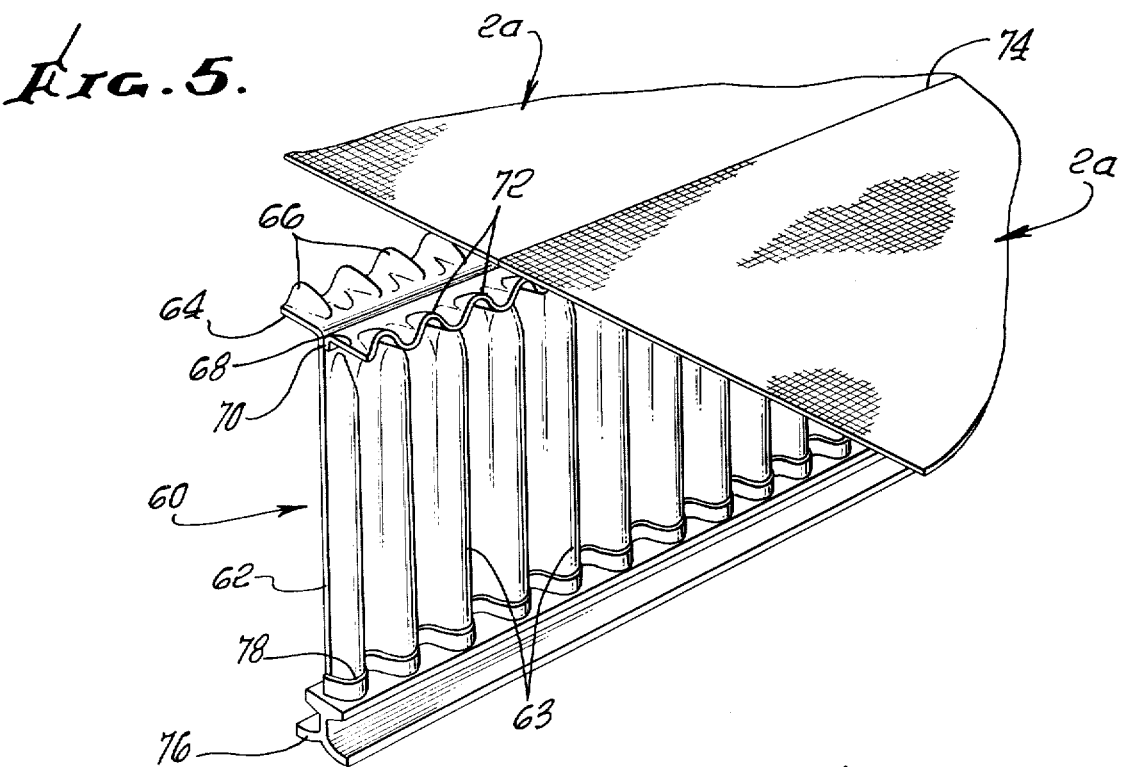
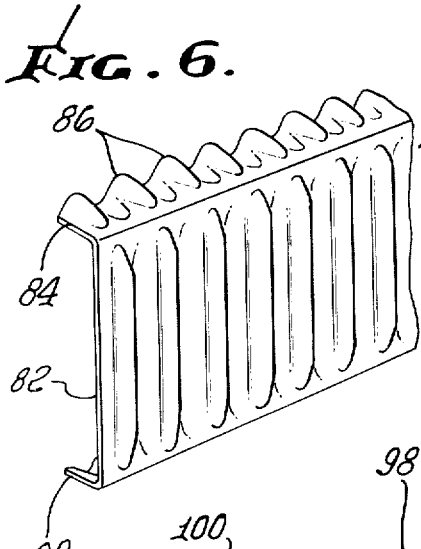
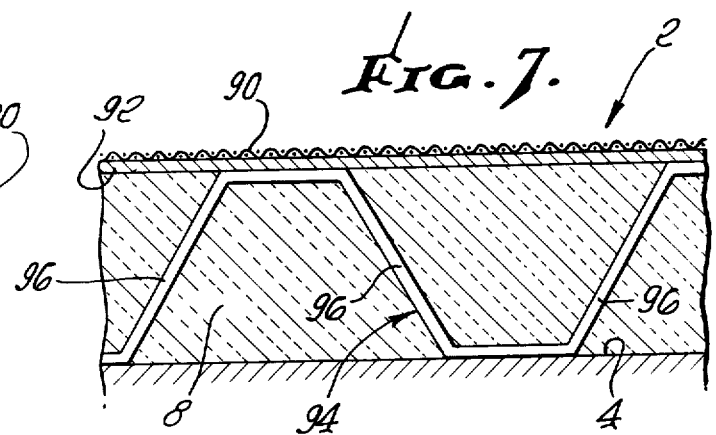
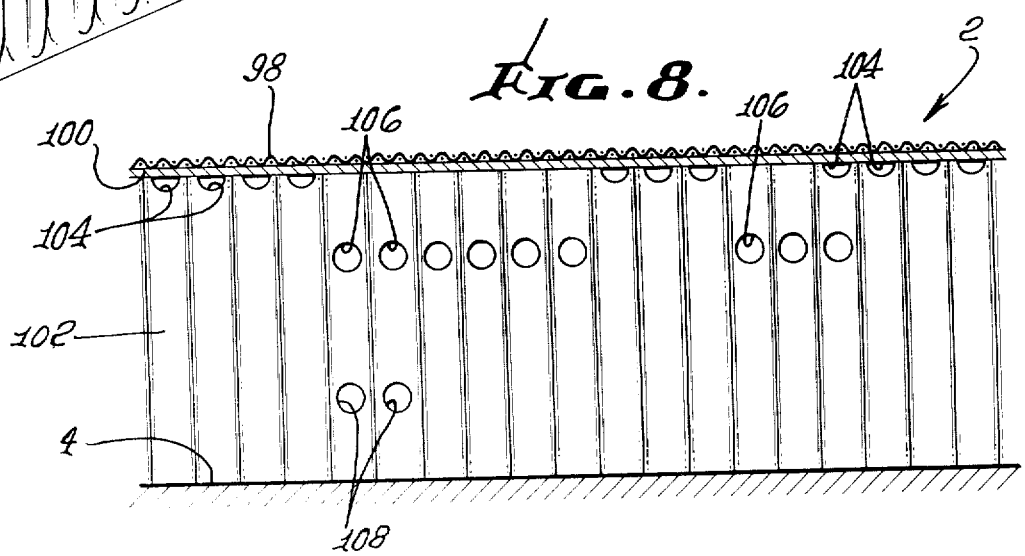

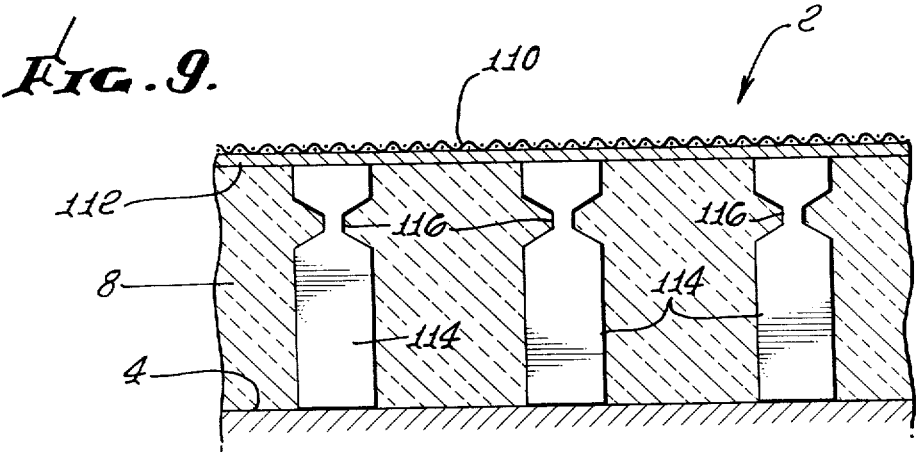
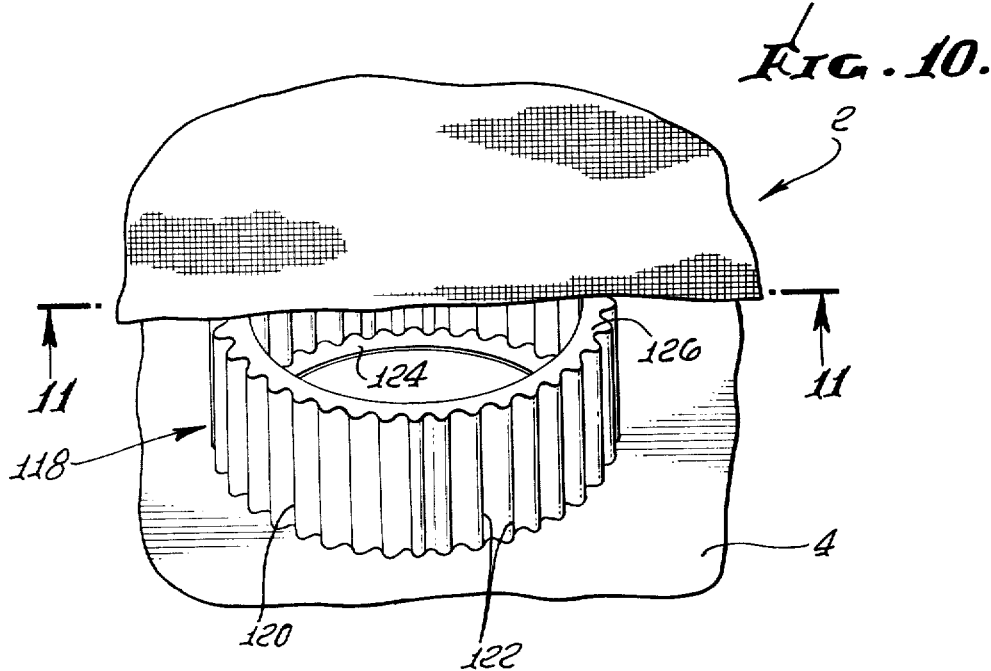
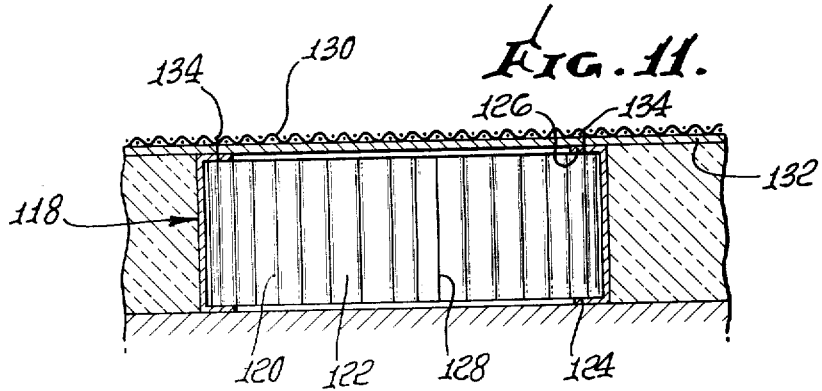

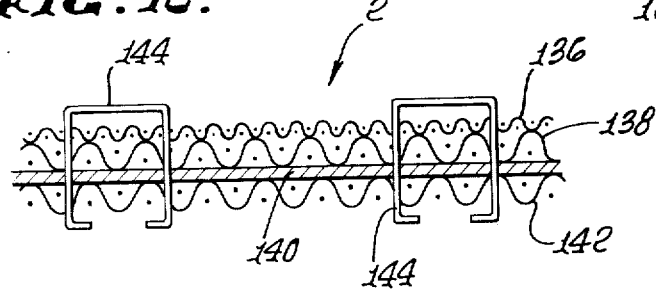
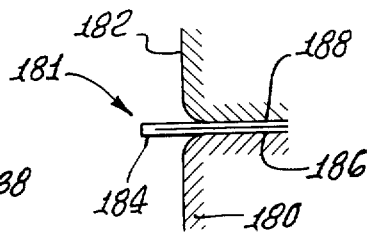
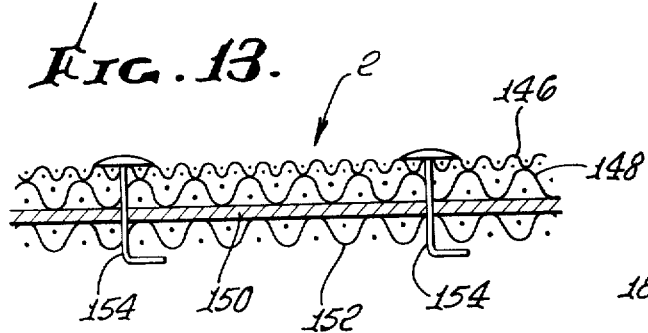
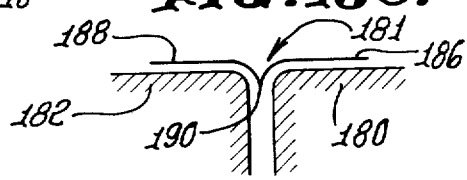
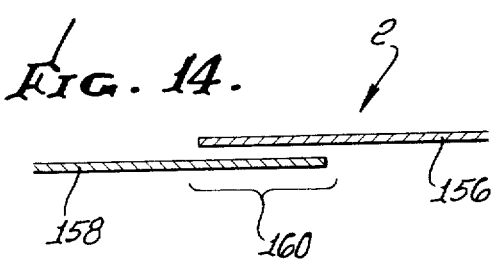
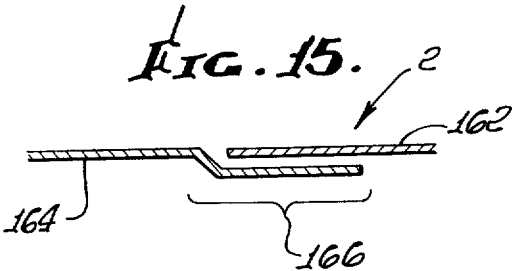
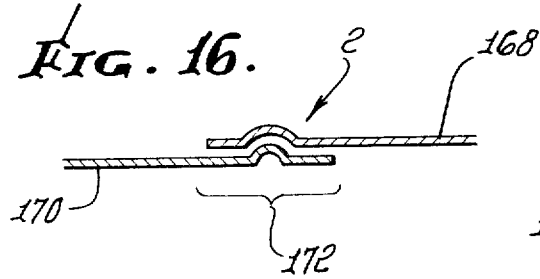
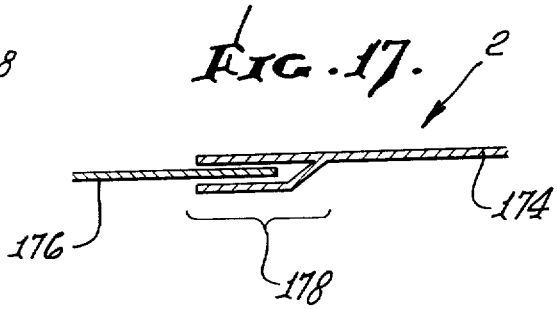

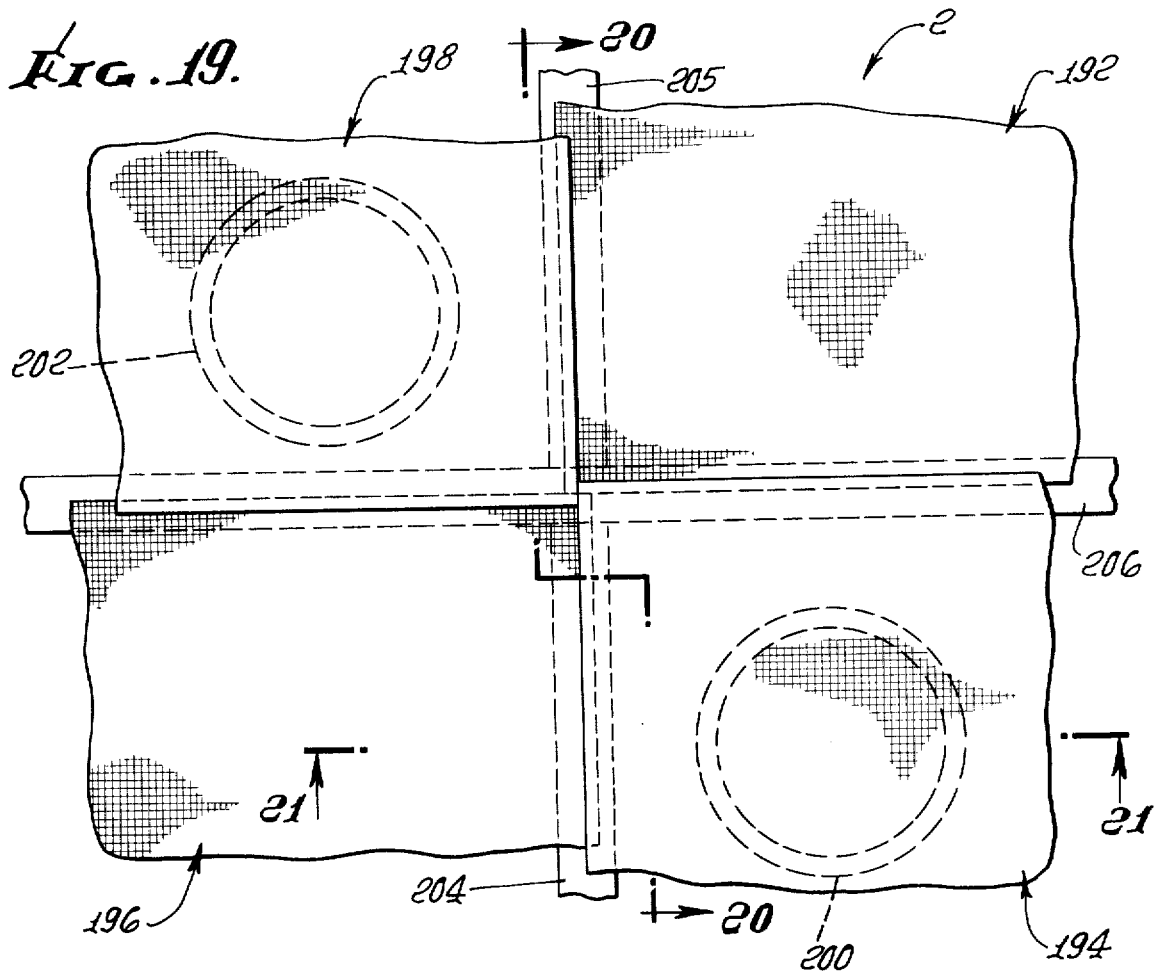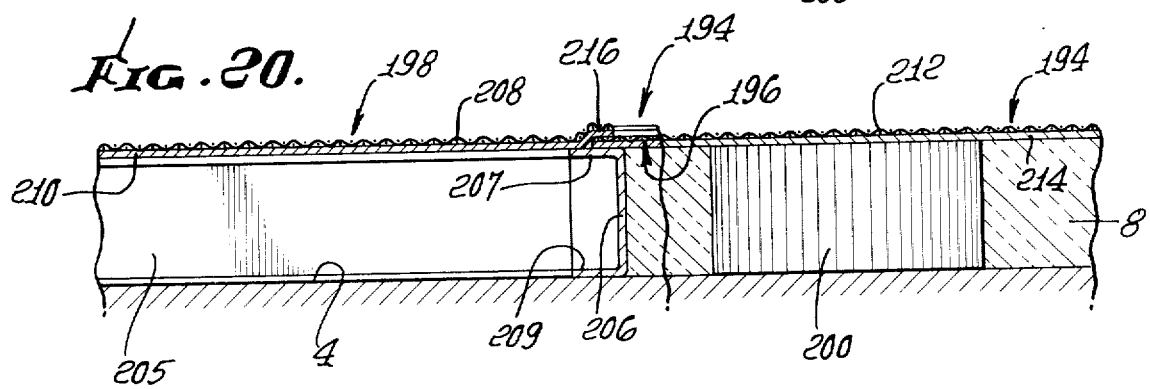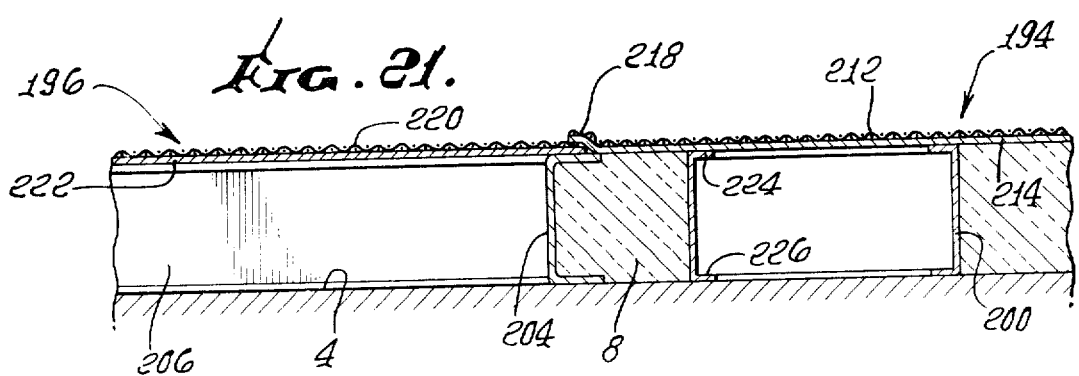

HIGH TEMPERATURE SKIN CONSTRUCTION

BACKGROUND OF THE INVENTION

During supersonic flight, an airfoil surface of an aircraft is subjected to high temperatures resulting from frictional contact of the air against the airfoil surface. These high temperatures may change the properties of the material forming the airfoil surface so that the material is weakened. Also, these high temperatures may cause weakening of the structural members which support the airfoil surface.

In addition to changes in the properties of the materials forming the airfoil surface and the structural members which support the airfoil surface, high temperatures can produce large thermal stresses in the airfoil surface and in the structural supporting members for the surface. Consider, for example, an aircraft which may depart from an airstrip in the Arctic where the airfoil surface and its supporting members have an initial temperature of 0° F. or less. After attaining supersonic speeds, the airfoil surface may reach a temperature of 1,000° F. or more. Assuming rigid points of connection between the members making up the airfoil surface and points of rigid connection between the airfoil surface and the underlying support structure, large thermal stresses are set up during heating of the airfoil surface from 0° F. to 1,000° F.

With a large increase in its temperature, the airfoil surface would like the expand freely; however, it is prevented from doing so by the various connection points. Thus, there are resistance forces at the connection points which oppose expansion of the airfoil surface. To relieve the internal stresses in the airfoil surface, the airfoil surface will have a tendency to distort which can alter the aerodynamic properties of the airfoil surface. In an extreme case, distortion of the airfoil surface due to thermal stresses may cause rupture of the surface or metal failure at one or more of the connecting points between the components of the airfoil surface or between the airfoil surfaces and the underlying structural support.

In view of the above problems which result from temperature variations in an airfoil surface, it would be desirable to have an airfoil structure which can absorb thermal stresses with the airfoil surface then being partially isolated from its supporting structure. By thermally isolating the airfoil surface from the supporting structure, the high temperatures developed by the airfoil surface would not be transmitted to the underlying structure. Thus, the supporting structure would not be weakened by being subjected to high temperatures. The airfoil surface could then be formed of a temperature-resistant material, such as stainless steel, while the underlying support structure could be formed of a more conventional material such as aluminum.

Further, in isolating the air foil surface from the underlying support structure, it would be desirable to provide an airfoil surface formed of a skin construction that is highly resistant to thermal stresses. Such a skin construction would be light in weight and yet capable of undergoing extreme fluctuations in temperature, such as a fluctuation of 2,000° F. or more, without rupture and without imposing unacceptably high stresses on the underlying support structure. Such a skin construction could be employed, not only for airfoil surfaces for conventional aircraft, but also for airfoil surfaces for a space reentry vehicle which would be exposed to even greater temperature fluctuations.

Such a skin construction could also be used for applications that are unrelated to airfoil surfaces but in which great temperature fluctuations are experienced. For example, in transporting high temperatures fluids through a conduit, the inner conduit surface may be formed of a skin construction which is thermally isolated from the outer portion of the conduit that serves as a supporting structure for the inner skin. The inner skin of the conduit would absorb thermal stresses so as to preserve the integrity of the skin and to isolate the thermal stresses from the outer portion of the conduit. In this manner, the conduit could be constructed more cheaply by forming the inne skin surface of a high temperature material such as stainless steel while forming the outer portion of the conduit of conventional materials such as cast iron, steel, aluminum, or elastomers that are serviceable at reduced temperatures.

SUMMARY OF THE INVENTION

The present invention supplies a solution to the aforementioned problems by providing a skin construction that is suitable for usage as a high temperature air foil surface. The skin construction includes a metallic member having first corrugations of a size and spacing that permits resilient thermal expansion of the member in a direction that is generally transverse to the direction of the first corrugations. Second corrugations are also provided in the metallic member with the second corrugations being positioned in a direction that is substantially transverse to the direction of the first corrugations. The second corrugations have a size and spacing which permits resilient thermal expansion of the metallic member in a direction transverse to the direction of the second corrugations.

The metallic member includes an imperforate metallic surface which is integral with the member. Thus, in usage at high temperatures, the thermal stresses imposed on the skin construction are absorbed by deformation of the first and second corrugations. These corrugations permit thermal growth of the skin construction in all directions and, during growth, the first and second corrugations act as expansion joints in providing for controlled expansion of the skin construction, without rupture of the imperforate metallic surface.

In providing first and second corrugations for the skin construction, a screen may be employed in which transversely positioned corrugations are formed by transversely positioned undulatng screen wires having a curvature similar to that of a sine wave. A thin metal foil having an imperforate surface may then be joined to the screen at discretely spaced points. The thickness of the foil and the spacing of the connection points between the foil and the screen is such that the foil may thermally deform in the regions between the discretely spaced points without rupturing.

The skin construction of the invention may also include a reflective surface which is positioned to reject radiant energy impinging on the skin construction. If the skin construction is used for a space reentry vehicle, the heating of the skin construction while the vehicle is outside the earth's atmosphere will result solely from radiant heating. Thus, the inclusion of a reflective surface to reject radiant energy will prevent radiant heating of the skin while the vehicle is in outer space.

If desired, the present skin construction may include a plurality of screens joined to a thin metal foil to form a composite skin construction in which each of the screens provides transversely positioned corrugations to relieve thermal stresses. In such a construction, the screens may be of varying sizes. For example, a fine mesh screen may be positioned outwardly of a thin metal foil with a coarser screen positioned either between the fine mesh screen and the metal foil or inwardly of the metal foil. The fine mesh outer screen may define the outer surface of the skin with the coarser screen providing additional support for the metal foil. Both the fine mesh screen and the coarser screen include transversely positioned corrugations to relieve thermal stresses when the skin construction is exposed to high temperatures. In providing contact between several screens in a composite skin construction, the lower surfaces defined by corrugations in one of the screens may be positioned in contact with the upper surfaces provided by corrugations in the other screen. In this manner, the distance of the heat flow path through the several screens is maximized to reduce heat transfer through the screens.

In joining a plurality of screens with one or more thin metallic foils to form a composite skin construction, the connections between the members making up the skin construction may be staggered to provide a lengthened heat flow path through the skin construction. Thus, for example, a fine mesh outer screen may be joined to an adjacent coarser mesh screen by discretely spaced connections which join only the two screens. Then, a thin metal foil may be joined to the coarser mesh screen through connections which are discretely spaced to permit deformation of the thin metal foil between the points of connection without rupture of the imperforate surface of the metal foil. The connections between the thin metal foil and the coarser mesh screen, which may be made by a high voltage-low amperage welding technique, such as pulse welding, may be spaced with respect to the similar connections between the fine mesh outer screen and the coarser mesh screen. By thus spacing the connections, the connections do not extend all the way through the composite skin construction but are staggered to provide a longer heat flow path, and to reduce heat transfer through the composite skin construction.

The skin construction of the invention may also include a layer of damping material. By including a layer of damping material, vibration of the skin construction may be reduced through absorption of vibrational energy by the damping material.

A further aspect of the invention involves the combination of a skin construction, as described, with a support structure for positioning the skin construction in spaced relation to an underlying structure. The support structure may include upstanding metallic support members which are connected to a surface of the skin construction with the support members including a corrugated upstanding surface. Thermal stresses which are imposed on the skin construction are absorbed by deformation of the first and second corrugations, as described, while thermal stresses imposed on the support members are absorbed by deformation of the corrugated upstanding surface.

The support members may include an upper foot which defines an attachment surface for connection of the support member to the skin construction. In addition, the support members may include a lower foot for attachment of the support members to an underlying structure. In this manner, the support members function to support the skin construction in spaced relation to the underlying structure.

The corrugated upstanding surface provided by the support member may define a closed curved surface which preferably is generally circular in cross section. Also, the corrugated upstanding surface may define an elongated open surface. In use, several different types of support members may be used together for support of the skin construction in spaced relation with respect to an underlying structure.

In restricting heat flow between the skin construction and the underlying structure, means may be provided to restrict the flow of heat from the skin construction through the support members. Thus, the upstanding corrugated surface may include a narrowed region which is positioned adjacent the skin construction. The heat transfer area afforded by the upstanding surface is reduced at the narrowed region with the narrowed region acting as a thermal choke to limit heat flow through the upstanding surface.

As another means of limiting heat flow, apertures may be formed in the upstanding surface. With the apertures preferably positioned adjacent the skin construction, the heat transfer area of the upstanding surface is reduced at the apertures to limit heat flow through the upstanding surface.

The connections between the skin construction and the support members may be discretely separated to permit thermal expansion and contraction of the skin construction at points intermediate the connection points between the skin construction and the support members. This permits the absorption of thermal stresses by expansion and contraction of the skin construction at points intermediate the discretely spaced connections between the skin construction and support members. As a result, the transmission of thermal stresses from the skin construction to the support members is reduced and the underlying support structure is, thereby, protected.

A skin construction having a relatively large surface area may be formed by joining together separate skin constructions having smaller areas. In joining the separate skin constructions together, support members may be placed beneath the jointure of the smaller skin constructions. In this manner, the support member may be connected to each of the smaller skin constructions to not only provide support but to assist in forming the jointure of the separate skin constructions.

A further aspect of the invention includes the combination of a skin construction and support members, as described, with an underlying structure with the support members providing a spaced relationship between the skin construction and the underlying structure. Insulation is then placed in the region between the skin construction and the underlying structure to limit the transfer of heat from the skin construction to the underlying structure. The skin construction and the construction of the support members, as described, serve to isolate the thermal stresses from the underlying structure. This permits the use of conventional structural materials in forming the underlying structure while the skin construction may be formed of a high temperature material such as stainless steel.

Depending upon the use environment, means may be provided to vent the space between the skin construction and the underlying structure to ambient pressure. For example, if the skin construction is an airfoil surface for a space reentry vehicle, the ambient pressure will range from atmospheric when the vehicle is on the ground to a pressure of essentially zero in the near vacuum of space. During the movement of a space reentry vehicle from ground level to outer space, unacceptable internal stresses would be imposed on the skin construction if the space between the skin construction and the underlying structure were permitted to remain at atmospheric pressure. Similarly, during movement of a reentry vehicle from outer space into the earth's atmosphere, unacceptable forces would be imposed on the outer surface of the skin construction if the space between the skin construction and the underlying structure was permitted to remain at zero pressure. By venting the space between the skin construction and the underlying structure to ambient pressure, the pressures on the inside and outside of the skin construction are the same and a change in internal pressure is accompanied by a corresponding change in the external pressure, and vice versa.

Depending upon the end use conditions, one portion of the skin construction may reach a higher temperature than another portion of the skin construction. Thus, if the skin construction defines an airfoil surface for a space reentry vehicle, the leading edge of the airfoil surface will reach a higher temperature than the trailing edge of the airfoil surface. In such a situation, it may be desirable to alter the spacing between the skin construction and the underlying structure with the spacing corresponding to the temperatures at different areas on the skin construction. Since the leading edge of an airfoil surface would be hotter than its trailing edge, the leading edge of the airfoil surface would then be spaced further away from the underlying structure than the trailing edge. This would provide a longer path for heat transfer between the leading edge of the airfoil surface and the underlying structure with a shorter path being provided between the trailing edge and the underlying structure.

DESCRIPTION OF THE DRAWINGS

In illustrating various embodiments of the invention, reference is made to the accompanying drawings in which:

FIG. 1 is a side sectional view illustrating a skin construction supported in spaced relation with respect to an underlying structure with the space between the skin construction and underlying structure being vented to ambient pressure;

FIG. 2 is an enlarged sectional view illustrating a skin construction having transversely positioned corrugations for relief of thermal stresses with the skin construction supported by elongated columns with respect to an underlying surface;

FIG. 3 is an enlarged sectional view illustrating a skin construction made up of a fine mesh outer screen, a coarser mesh screen, a thin metal foil, and a supporting coarser mesh screen positioned internally of the thin metal foil;

FIG. 4 is a sectional view illustrating another embodiment of a skin construction which includes a fine mesh outer screen, a thin metal foil, a layer of damping material, and a coarser mesh inner screen;

FIG. 5 is an enlarged pictorial view illustrating a support column having an upstanding corrugated surface, an upper foot, and a lower foot, with the support column beneath the jointure of two skin sections;

FIG. 6 is a partial pictorial view illustrating another embodiment of support column for the skin construction;

FIG. 7 is a sectional view illustrating a skin construction with channal support for maintaining the skin construction in spaced relation to an underlying structure;

FIG. 8 is a sectional view illustrating the use of apertures in an upstanding corrugated surface of a column support to limit heat flow through the upstanding surface;

FIG. 9 is a sectional view illustrating the use of support members for a skin construction which have a narrowed region positioned adjacent the skin construction to limit heat flow through the support members;

FIG. 10 is a partial pictorial view illustrating a skin construction supported by a cupcake support having a corrugated upstanding closed surface;

FIG. 11 is a sectional view taken along the line 11—11 of FIG. 10 and illustrating the connection of a skin construction to an upper foot of a cupcake support with the points of connection being discretely spaced;

FIG. 12 is a sectional view illustrating a skin construction in which the component parts are held together by staples;

FIG. 13 is a sectional view of a skin construction in which the component parts are held together by brads;

FIG. 14 is a sectional schematic view illustrating the connection of two skin sections through use of an overlapping joint;

FIG. 15 is a sectional schematic view illustrating the connection of two skin sections through a compound overlapping joint;

FIG. 16 is a sectional schematic view illustrating the connection of two skin sections through a corrugated overlapping joint;

FIG. 17 is a sectional schematic view illustrating the connection of two skin sections through a bayonet joint;

FIGS. 18a, 18b, and 18c are sectional schematic views illustrating a hinged connecting joint between two skin sections with the hinged joint being moved from a closed to an open position during application of the skin sections;

FIG. 19 is a partial plan view illustrating the connection of four skin sections together using both cupcake and column supports in supporting the skin sections;

FIG. 20 is a sectional view taken along the line 20—20 of FIG. 19 to illustrate the manner in which the skin sections are joined together, and FIG. 21 is a sectional view taken along the line 21—21 of FIG. 19 and illustrating further the connection of the skin sections.

DETAILED DESCRIPTION

FIG. 1 illustrates a skin construction 2 which is curved to define an airfoil surface with the skin construction supported in spaced relation to a support surface 4 by support members 6. Insulation 8, such as the insulation disclosed in copending commonly assigned applications Ser. Nos. 352,218 and 352,309, both filed Apr. 18, 1973, both applications being continuations-in-part of Ser. No. 272,469, filed July 17, 1972, may be placed between the skin construction 2 and support surface 4 to inhibit the transfer of heat from the skin construction to the support surface.

As illustrated, the spacing between the skin construction 2 and support surface 4 may be varied with, for example, a greater spacing at the leading end 10 of the airfoil surface and a lesser spacing at the trailing end 12.

During movement of the airfoil surface through the air, frictional contact with the air will be greatest at the leading end 10 and the least at the trailing end 12. Thus, the leading end 10 will be at a higher temperature than the trailing end 12 with a result that more insulation 8 will be needed at the leading end. The spacing between the skin construction 2 and support surface 4 may be decreased in a uniform manner between the leading end 10 and the trailing end 12 to correspond with the gradual decrease in temperature between the leading end and trailing end of the airfoil surface. In providing a gradual decrease in the spacing, the support members 6 may be gradually decreased in height with shorter members positioned adjacent the trailing end 12 and longer members adjacent the leading end 10.

A vent 9 leads from the region defined by the spacing between skin construction 2 and support surface 4 into a conduit 11 having an outlet (not shown) to the atmosphere. In this manner, the internal pressure on skin construction 2 may be equalized with the external pressure on the skin construction. Thus, when the airfoil surface formed by skin construction 2 undergoes rapid altitude changes, the skin construction is protected from an imbalance between internal and external pressures on the skin construction.

FIG. 2 is an enlarged sectional view illustrating one form of skin construction 2 and the manner in which it may be supported with respect to the support surface 4. An exterior screen 14 defines the outer surface of skin construction 2 with the screen having transversely positioned undulating wires which define transversely positioned corrugations on the exterior surface of the skin construction. The wires of the screen 14 are positioned with respect to each other by frictional forces between the wires. Thus, the wires may undergo relative movement with respect to each other during expansion or contraction of the wires due to temperature changes. The wires of the screen 14 are illustrated as having a circular cross section; however, the wires may have any desired cross section, such as rectangular, providing that the wires positioned in either direction have an undulating configuration which is similar to that of a sine wave.

The screen 14 will typically be formed of a material having resistance to high temperature, such as stainless steel or a nickel-chrome alloy, such as Inconel 600. The mesh size of screens which may be used in the skin constructions of the invention may range, for example, from about 50 to 320 wires per inch. The transversely positioned corrugations defined by the wires of the screen 14 act as expansion joints during rapid heating of the screen over a range, for example, from ambient temperatures to as high as 2,000 F. or higher. Thus, during thermal expansion or contraction of the wires, elastic deformation of the screen wires is permitted by the transversely positioned corrugations defined by the wires.

The wires of the screen 14 may also, for example, be formed of refractory metals or their alloys, such as tungsten, molybedenum, colombium, tantalum, iridium, or rhodium, and the wires of the screen may also include an oxidation-resistant coating. A suitable oxidation-resistant coating is, for example, a di-silicide coating which forms an external barrier to oxidation. In utilizing a screen, such as screen 14, to form the exterior surface of the skin construction 2, the screen will typically be of a fine mesh so that the outer surface is generally smooth and generates less friction with exposure to air flow. Also, the use of a finer mesh screen in forming the outer surface of the skin construction 2 reduces the tendency of the screen to retain foreign matter, such as dirt, which could have an adverse affect on the smoothness of the surface of the skin construction and its resistance to air flow.

The roughness of the exterior surface of the skin construction 2 may also be intentionally varied to control the emissivity of the outer surface. By increasing the roughness of the exterior surface, its emissivity may be raised. The reflectivity of the exterior surface of the skin construction 2 may be varied independently of the emissivity by varying the material used in forming the surface. By, thus, increasing the emissivity of the exterior surface while also increasing its reflectivity, the skin construction may be designed to reject a large percentage of radiant energy through reflection while radiating a large percentage of heat from the exterior surface to remove heat from the skin construction. The design considerations of high reflectivity and high emissivity are very important when the skin construction 2 is to be used outside the earth's atmosphere where the only heat transfer mechanism for heating or removing heat from the skin construction 2 involves radiation.

As illustrated, the screen 14 is a square weave screen in which the undulating wires of the screen are positioned at right angles. Other forms of screens which may be employed are, for example, the twilled square weave, and the basket weave. Any of the various types of screens may be used in forming the skin construction 2 providing that the screen does not use straight wires, i.e., wires which do not have a modified sinusoidal configuration. Thus the transverse wires of the screen and the transverse corrugations formed therefrom need not be positioned at right angles and the screen wires could, for example, cross each other at other angles, such as 45° or 30°. However, use of screens with straight wires is to be avoided since the straight wires do not form corrugations for relief of thermal stresses in the skin construction.

Positioned adjacent the screen 14 is a thin metal foil 16 which is attached to the screen 14 at discretely spaced connections 18. The thin metal foil 16 will typically have a thickness of about 0.0005 to about 0.005 inches with the metal foil defining an imperforate surface. The metal foil may be formed of a high-temperature resistant material such as stainless steel or any of the refractory metals enumerated previously. Also, the metal foil 16 may have an oxidation-resistant coating such as a disilicide coating and the exterior surface of the foil may be roughened to increase its emissivity.

The thickness of the metal foil 16 and its strength are such as to permit an expansion of about 1% for each 1,000° F. change in temperature without rupture of the foil. Thus, the foil 16 is permitted to deform in the intermediate regions between the discretely spaced connections 18. The spacing of the connections 18 may range from ¼ of an inch down to as low as about 0.010 inches and typically, the spacing between the connections will range in the order of about ten times the thickness of the metal foil 16. This permits thermal expansion or contraction of the foil 16 in the regions between the connections 18 without rupture of the foil.

The support members 6 retain the skin construction 2 in spaced relation with respect to the support surface 4 with the support members including an upright section 20 having an upper foot 22 and a lower foot 24. The upper foot 22 may be connected to the foil 16 through connections 19 while the lower foot 24 is connected to the surface 4 through connections 21.

FIG. 3 illustrates another form of skin construction in which a fine mesh screen 26 forms the outer surface of the skin construction and is connected to a coarser mesh screen 28. The coarser mesh screen 28 is in turn connected to a thin metal foil 30 which is connected to a coarser mesh screen 32. The screens 26, 28 and 32 each form transversely positioned corrugations, as described previously, which permit thermal expansion and contraction of the screens. In connecting the component members of the skin construction together, the lower surfaces defined by corrugations 34 of screen 26 may be joined to the upper surfaces defined by corrugations 36 of screen 28.

Connections 38 between the corrugations 34 and 36 may be formed by any procedure which does not generate large amounts of heat that could deform the screens. Thus, for example, the connections 38 may be formed by a high voltage-low amperage welding technique, such as pulse welding. Pulse welding may be carried out, for example, with the Model 1-133-02 UNITEK Power Supply manufactured by Unitek Corporation, Weldmatic Division, 1820 South Myrtle, Monrovia, California. In using the Model 1-133-02 Power Supply, various probe end pieces, such as Model 5-015-01 and Model 5-013-01 may be used as well as the Model SA-3010 Varimatic Seam Weld Control, all supplied by Weldmatic Division of Unitek Corporation.

Pulse welding permits precision welding without discoloration or deformation of the parts which are welded together and is accomplished by use of a high voltage-low amperage pulse measured in the order of milliseconds through discharge of a capacitor. Other means of connecting thin parts without deformation, such as ultrasonic welding, may be used in forming the skin construction of the invention.

The lower surfaces defined by corrugations 36 of screen 28 may be joined to the metal foil 30 at connections 37 while the upper surfaces defined by corrugations 40 may be joined to the thin metal foil at connections 42. The connections 37 and 42 may be formed in any convenient manner, such as pulse welding as described above. As illustrated, the connections 38, 37, and 42 are staggered or laterally offset with respect to each other. Thus, the connections do not provide a straight-through path which would act as a thermal short through the skin construction 2. By being staggered, the connections 38, 37, and 42 provide a long heat flow path which reduces heat flow through the skin construction 2.

FIG. 4 illustrates a further form of skin construction 2 in which a fine mesh screen 44 is joined to a thin metal foil 46 through connections 54. A coarser mesh screen 50 is also joined to the thin metal foil 46 through connections 58. The coarser mesh screen 50 is joined to the thin metal foil 46 through a damping layer 48 formed, for example, of finely divided randomly oriented metal wool. The connections 58 lead from the thin metal foil to the upper surfaces defined by corrugations 56 of the screen 50. The damping layer 48 absorbs vibrational energy and, thus, serves to prevent vibration of the skin construction 2. The connection 58 are laterally offset with respect to connections 54 that connect the lower surfaces defined by corrugations 52 to the thin metal foil 46. Thus, as described previously, the spacing of the connections provides a long heat flow path through the skin construction to reduce heat transfer through the skin construction.

Turning to FIG. 5, two sections 2a of a skin construction are supported by a longitudinal column 60 having a corrugated upright section 62. A corrugated upper foot 64 is joined to the upright section 62 and a second corrugated upper foot 68 is joined to the upright section 62 through a joint 70. The joint 70 may be formed by any convenient means such as pulse welding as described previously.

As illustrated, the corrugated upper feed 64 and 68 together with the upright section 62 provide a section having an I-configuration. The corrugation at the upper feet 64 and 68 define upper surfaces 66 and 72 which bear against the undersurface of the skin sections 2a. In joining the feet 64 and 68 to the skin sections 2a, the connections may be made at the upper surfaces 66 and 72 with the points of connection being discretely spaced from each other. The support surfaces defined by the upper feet 64 and 68 are illustrated as being positioned beneath a seam 74 between the skin sections 2a. By joining the upper surfaces 66 to one of the skin sections 2a while joining the upper surfaces 77 to the other of the skin sections 2a, the column 60 not only provides support for the skin sections but also assists in forming the joint between the skin sections.

The column 60 has a lower foot 76 which may be made of plastic and is joined to the corrugated upright section 62 along a joint 78. The foot 76 may be made, for example, of an epoxy resin having low thermal conductivity with the joint 78 being formed, for example, by use of an appropriate plastic cement or ultrasonic welding. The lower foot 76 bears against a supporting surface, such as the supporting surface 4 described previously in regard to FIGS. 1 and 2. The upright section 62 defines an open elongated surface which makes the column 60 useful for placement beneath a seam, such as the seam 74, between two skin sections.

Individual corrugations 63 defined by the section 62 permit the upright section to undergo thermal expansion or contraction with the corrugations 63 acting in the manner of expansion joints. The corrugations 63 also permit the upper portion of column 60 to expand thermally to a greater extent than the lower portion of column 60, or for the upper portion of the column to move relative to the lower portion of the column due to the application of external forces. By way of illustration, the corrugations 63 may be viewed as analogous to the corrugations in the bellows for an accordion. Thus, when the upper portion of the column 60 grows to a greater extent than the lower portion of the column, the corrugations 63 may each have a truncated pie-shaped configuration with the corrugations being wider at their tops than at their bottoms. In this manner, thermal stresses resulting from temperature changes in the column can be accommodated in the upright section 62 without transmission of the stresses through the lower foot 76 into an underlying support structure.

FIG. 6 illustrates a further embodiment of a support in which a column 80 has a channel configuration rather than the I-beam configuration of column 60 in FIG. 5. The column 80 includes a corrugated upright section 82 which is connected to an upper foot 84. The corrugations in the upper foot 84 define upper surfaces 86 which are discretely spaced apart for connection to the skin construction 2. A lower foot 88 is also connected to the upright section 82 with the lower foot being used for connection to an underlying support structure, such as the surface 4 described previously.

FIG. 7 illustrates another form of support construction in which a skin construction 2 is supported by a corrugated channel support 94 with respect to a surface 4. The channel support 94 includes pairs of diverging arms 96 to define a long heat flow path between the skin construction 2 and the surface 4. The skin construction 2 may, as described previously, be formed from a fine mesh outer screen 90 connected to a thin metal foil 92. As illustrated, the wires of the screen 90 define transversely positioned corrugations which serve as expansion joints in relieving thermal stresses in the skin construction 2.

As illustrated in FIG. 8, a skin construction 2 may be supported with respect to a surface 4 through a corrugated upright section 102 having apertures therein such as apertures 104, 106 and 108. The skin construction 2 may be formed of a fine mesh outer screen 98 joined to a metal foil 100 with the apertures in the upright section 102 serving to reduce the heat transfer area through the upright section. Preferably, the apertures in the upright section 102 are closely spaced to the hot region represented by the skin construction 2. Thus, the use of apertures such as 104 is preferable to the use of apertures 108 since apertures 104 inhibit heat transfer into the section 102 while apertures 108 do not prevent heat transfer into the upright section but only function to inhibit heat transfer from the section into the surface 4.

FIG. 9 illustrates another means for limiting heat transfer between a skin construction 2 and a supporting surface 4. The skin construction 2 may be formed of a fine mesh screen 110 joined to a thin metal foil 112 with the skin construction being supported in spaced relation to the surface 4 by columns 114. The columns 114 are illustrated as having narrowed regions 116 positioned adjacent to the skin construction 2. The narrowed regions 116 reduce the heat transfer area of the columns 114 and, thus, serve to inhibit heat transfer from the skin construction 2 into the columns 114.

FIG. 10 illustrates the use of a support column 118 having cupcake configuration in supporting the skin construction 2 in spaced relation to the support surface 4. The support column 118 includes a closed upstanding surface 120 having corrugations 112. Also, the column 118 includes a lower foot 124 which contacts the surface 4 and an upper foot 126 which contacts the skin construction 2. The advantage of the column 118 is that the cupcake configuration, while light in weight, provides great resistance to lateral forces applied to any direction. Moreover, the corrugations 122 in the closed surface 120 permit thermal expansion and contraction of the surface 120 with the corrugations 122 serving as expansion joints.

FIG. 11 is a sectional view taken along the line 11—11 of FIG. 10. As shown, the ends of the metallic member forming the surface 120 may be joined together at a seam 128 through any convenient means, such as pulse welding, to provide a closed surface. The skin construction 2 may, as described previously, include a fine mesh screen 130 whose wires from transversely positioned corrugations with the screen being joined to a thin metal foil 132. The skin construction 2 may be joined to the upper foot 126 by discretely spaced connections 134 to permit relative movement between the skin construction 2 and column 118 in the intermediate regions between the connections 134.

Skin constructions may be made in a variety of ways in accord with the invention depending upon the end use requirements of the skin construction. Thus, for example, the high cost of a manufacturing technique such as pulse welding may not be justified if the end use requirements for the skin construction are less stringent and do not require staggered connection points to lengthen the heat flow path through the skin construction.

FIG. 12 illustrates a skin construction 2 in which a fine mesh outer screen 136, a coarser mesh screen 138, a thin metal foil 140, and a coarser mesh screen 142 are joined together with staples 144. The use of the staples 144 as a means of joining the component parts of the skin construction together provide a means of joining which is readily suited to high speed mass production. While the staples 144 provide heat shorts through the skin construction 2, this would not be a great disadvantage in use applications where the skin construction is subjected to lower temperatures. Also, the increase in the heat transferred through the skin construction 2 by staples 144 may be compensated for by providing a thicker layer of insulation between the skin construction and underlying support structure.

Another means of forming a skin construction 2 is illustrated in FIG. 13 in which a fine mesh outer screen 146, a coarser mesh screen 148, a thin metal foil 150, and a coarser mesh support screen 52 are joined together with brads 154. The brads 154, like staples 144, afford a rapid means of joining the components of the skin construction while, at the same time, have the disadvantage of increasing heat transfer through the skin construction.

The skin constructions of the invention may be formed as flexible blankets such that they can be folded up for transportation, storage, etc. In usage, smaller skin sections are joined together to form an overall skin construction designed for a particular purpose, such as an air foil surface or an inner surface of a conduit for conveying hot liquids or gases, etc. A variety of means may be used for joining separate skin sections together to form an overall skin construction. Thus, as illustrated in FIG. 14, skin sections 156 and 158 may be joined together through a simple overlapping joint 160 with the joint being seamed, for example, through a pulse welding technique. Similarly, as shown in FIG. 15, skin sections 162 and 164 may be joined together through a compound overlapping joint 166.

FIG. 16 illustrates still another means of joining separate skin sections together in which skin sections 168 and 170 are joined through a corrugated overlapping joint 172. The additional contact surface provided by corrugated overlapping joint 172 has the advantage of increasing the strength of the joint. Still another means of joining skin sections together is illustrated in FIG. 17 in which skin sections 174 and 176 are joined together through a bayonet joint 178. The bayonet joint 178, while affording a large contact surface and greater strength, has the disadvantage of being more complex and, thus, more expensive than a joint such as the simple overlapping joint 160 shown in FIG. 14.

Frequently, it may be desirable to have a flexible joint between separate skin sections. The use of a flexible joint has the advantage of permitting the skin sections to be stacked relative to each other for shipment or storage with the joint then being opened when the sections are laid up to form a surface having a particular configuration. Further, the use of a flexible joint may be advantageous in providing greater flexibility between separate skin sections after they are laid up to form a surface.

FIGS. 18a–18c illustrate a flexible folding joint 181 with FIG. 18a illustrating skin sections 180 and 182 in a stacked array and separated by the flexible joint. The flexible joint 181 is formed by a folded connecting strip 184 having a top layer 188 connected to section 182 and a bottom layer 186 connected to section 180.

During opening of the joint 181, as shown in FIG. 18b, the skin section 182 is rotated in the direction of the arrow A about a hinge point 190 through which the layers 186 and 188 are connected. After full rotation of the skin section 182 in the direction of arrow A, the skin sections 180 and 182 assume the position shown in FIG. 18c. In the position shown in FIG. 18c, the joint 181 is fully opened with the skin sections 180 and 182 now being laid up to form a particular surface such as an airfoil surface.

In forming a complex construction, a number of skin sections may be joined together and both elongated columns and cupcake columns may be used in providing the necessary support. The precise manner of joining the skin sections together and the precise placement of supports will, of course, be determined by a number of factors so that it is not possible to generalize about the manner in which complex structures are formed from a number of skin sections and a number of supports.

FIG. 19 illustrates the connecting together of a number of skin sections 192, 194, 196, and 198 to demonstrate some of the variables involved in joining skin sections to form a more complex structure. As illustrated, cupcake column supports 200 and 202 are used in conjunction with longitudinal column supports 204, 205, and 206. By using a combination of cupcake column supports and longitudinal column supports, the overall strength of a complex structure may be maximized by taking advantage of the structural features offered by both the cupcake and the longitudinal column supports. As illustrated, the longitudinal column support 206 is in contact with all of the sections 192, 194, 196, and 198 while the longitudinal columns 204 and 205 are connected to the column 206 and extend transversely therefrom. Column 205, thus, supports sections 192 and 198 while column 204 supports sections 194 and 196.

FIG. 20, taken along the line 20—20 of FIG. 19, illustrates the joint between skin sections 196 and 198 as well as the placement of the longitudinal column 206 beneath the joint. Skin section 198, which may include a fine mesh screen 208 and a thin metal foil 210, as previously described, is positioned in contact with an upper foot 207 of column 206 while a lower foot 209 is in contact with a support surface 4. The insulation 8 is not shown in the left portion of FIG. 20 to illustrate more fully the structure of the column 206 and its relation to the joint between the sections 196 and 198.

As shown, a compound overlapping joint 216 joins the skin sections 196 and 198 together with skin section 198 being bent outwardly and joined to the outer surface of skin section 196. The longitudinal column support 206 runs beneath the compound joint 216 and, thereby, provides support to skin sections 196 and 198 at the joint. In addition, the column 206 runs beneath a similar compound joint connecting the skin sections 192 and 194. As illustrated in FIG. 19, the compound joint between sections 192 and 194 is formed by bending the edge of the section 194 upwardly to lie over the edge of the section 192.

Turning again to FIG. 20, insulation 8 is provided between the skin construction 2 and the underlying structure represented by the surface 4. This limits the extent of heat transfer between the skin section 2 and the underlying structure. The cupcake support column 200 provides support between the skin section 194 and the surface 4 with the cupcake column providing great resistance to lateral forces, as described previously. The skin section 194 may be formed, as described previously, from a fine mesh screen 212 which forms transversely positioned corrugations for relief of thermal stress with the screen 194 being joined to a thin metal foil 214 which is tacked or connected at discretely spaced points to the screen.

FIG. 21, which is a partial sectional view taken along the line 21—21 of FIG. 19, illustrates the connection between the skin sections 194 and 196. The skin section 196 which may be formed from a fine mesh screen 220 joined at discretely spaced points to a thin metal foil 222, is connected to the skin section 194 through a compound overlapping joint 218. In forming the joint 218, the skin section 194 is bent upwardly to overlie the edge of the skin section 196. Positioned beneath the compound overlapping joint 218 is the longitudinal column support 204 which, thereby, provides support to both sections 194 and 196 at the joint 218. To illustrate the details of the columns, etc., the insulation 8 is not shown in the left portion of FIG. 21.

The cupcake column support 200 shown in section in FIG. 21 includes an upper foot 224 which is joined at discretely spaced points to the metal foil of skin section 194. The column 200 also includes a lower foot 226 which is joined to the supporting surface 4 with the column, thereby, supporting the skin section 194 in spaced relation with respect to the underlying support surface 4.

As illustrated in the foregoing description, the skin construction and supporting columns of the invention provide a means of isolating an underlying support structure from the thermal and structural effects produced by temperature changes in the skin construction. Thus, the underlying support structure may now be formed from conventional construction materials. Further, the skin construction may be light in weight and, yet, highly resistant to thermal stresses without rupture of the imperforate surface formed by the skin construction. By joining skin sections together and by using both longitudinal and cupcake support members, the present skin construction may be embodied in a wide variety of complex structures such as airfoil surfaces, conduits for high temperature liquids, etc. Thus, the present invention makes available a whole spectrum of new structures for whatever purpose which are highly resistant to great changes in temperature.

I claim:

1. A metallic skin construction suitable for usage as a high temperature airfoil surface comprising:

a screen having a first set of wires and a second set of wires with the second set of wires being positioned generally transverse to the direction of the first set of wires;

the wires in said first set of wires having a generally undulating form which defines first corrugations;

the wires in said second set of wires having a generally undulating form which defines second corrugations;

the wires of said first set of wires being movable with respect to the wires of said second set of wires such that said first and second corrugations are free to expand and contract in a relatively independent manner with respect to each other;

a metallic foil having an imperforate surface;

means joining the foil to the screen at discretely spaced points, and the foil being sufficiently thin to deform without rupturing during relative movement of the foil and screen at intermediate locations between the discretely spaced points, whereby thermal stresses on said skin construction are absorbed by deformation of said first and second corrugations in which the first and second corrugations act in a relatively independent manner as expansion joints in providing for controlled expansion of the skin construction without rupturing of said imperforate metallic skin surface.

2. A metallic skin construction suitable for usage as a high temperature airfoil surface comprising:

means providing an imperforate metallic skin surface in said skin construction;

means providing first corrugations and second corrugations in said skin construction with said first and second corrugations being free to expand and contract in a relatively independent manner with respect to each other;

said first corrugations having a size and spacing which permits resilient expansion of said skin construction in the direction along the plane of said metallic skin surface and in a direction transverse to the direction of said first corrugations;

said second corrugations positioned in a direction substantially transverse to said first corrugations;

said second corrugations having a size and spacing which permits resilient thermal expansion of said skin construction in a direction along the plane of said metallic skin surface and in a direction transverse to the direction of said second corrugations, whereby thermal stresses imposed on said skin construction are absorbed by deformation of said first and second corrugations which first and second corrugations act in a relatively independent manner as expansion joints in providing for controlled expansion of the skin construction without rupture of said imperforate metallic skin surface.

3. The skin construction of claim 2 including a reflective surface on said foil, and said reflective surface directed outwardly to reject radiant energy impinging on said skin construction.

4. The skin construction of claim 1 including a plurality of screens joined to a thin foil in forming a skin construction, and each of said screens having transversely positioned corrugations.

5. The skin construction of claim 1 including a fine mesh outer screen having transversely positioned corrugations defined by the wires forming the outer screen;

a first coarser screen positioned inwardly adjacent the outer screen;

said first coarser screen having transversely positioned corrugations defined by the wires forming the first coarser screen;

a thin metallic foil having an imperforate surface positioned inwardly adjacent the first coarser screen;

a second coarser screen positioned inwardly adjacent the metallic foil;

said second coarser screen having transversely positioned corrugations defined by the wires forming the second coarser screen, and means joining the outer screen, the first coarser screen, the metallic foil and the second coarser screen to form a composite skin construction.

6. The skin construction of claim 5 wherein the fine mesh outer screen and first coarser screen are positioned with the lower surfaces defined by the corrugations in the outer screen in contacting relation with the upper surfaces defined by the corrugations in the first coarser screen, whereby the distance of the heat flow path through the outer screen and the first coarser screen is maximized.

7. The skin construction of claim 4 wherein the plurality of screens and the metallic foil are joined together by connections which are staggered to provide a lengthened heat flow path through the skin construction.

8. The skin construction of claim 2 including a layer of damping material, whereby vibration of the skin construction is reduced through absorption of vibrational energy by the damping material.

9. The skin construction of claim 8 wherein said damping material is metal wool.

10. A metallic skin construction suitable for usage as a high temperature airfoil surface comprising:

a fine mesh outer screen composed of a first set of wires and a second set of wires positioned transversely to said first set of wires;

the wires in said first set having an undulating configuration to define first corrugations and the wires in said second set having an undulating configuration to define second corrugations;

said first corrugations being generally transverse with respect to said second corrugations;

a metallic foil having an imperforate surface positioned inwardly adjacent said outer screen;

a layer of damping material positioned inwardly adjacent said metallic foil;

a coarser mesh screen having a first set of wires and a second set of wires positioned generally transverse to the first set of wires in said coarser screen;

said first set of wires in said coarser screen having an undulating configuration which defines first corrugations in said coarser screen;

said second set of wires in said coarser screen having an undulating configuration which defines second corrugations which are positioned generally transverse to the first corrugations in said coarser screen;

said coarser screen being positioned inwardly adjacent said layer of damping material, and means joining the outer screen, the metallic foil, the layer of damping material and the coarser screen to form a composite skin construction.

11. The combination of claim 10 wherein the outer screen, the metallic foil, the damping layer and the coarser screen are joined together by connections which are staggered to provide a lengthened heat flow path through the skin construction.

12. The skin construction of claim 1 wherein the screen and foil are joined by welding.

13. The skin construction of claim 1 wherein the screen and foil are joined by staples.

14. The skin construction of claim 1 wherein the screen and foil are joined by brads.

15. The construction of claim 1 including
a plurality of said skin constructions;
each of said skin constructions having a smaller area, and
said skin constructions having a smaller area being joined together to form a skin construction having a larger area.

16. The construction of claim 15 including an overlapping joint between said skin constructions having a smaller area.

17. The construction of claim 15 including a compound overlapping joint between said skin constructions of smaller area.

18. The construction of claim 15 including a corrugated overlapping joint between said skin constructions of smaller area.

19. The construction of claim 15 including a bayonet joint between said skin constructions of smaller area.

20. The construction of claim 15 including a flex hinged joint between said skin constructions of smaller area.

21. In combination, a metallic skin construction and support structure suitable for usage as a high temperature airfoil surface with the skin construction positioned in spaced relation to an underlying structure through said support structure, said combination comprising:
means providing an imperforate metallic skin surface in said skin construction;
means providing first corrugations and second corrugations in said skin construction with said first and second corrugations being free to expand and contract in a relatively independent manner with respect to each other;
said first corrugations having a size and spacing which permits resilient expansion of said skin construction in the direction along the plane of said metallic skin surface and in a direction transverse to the direction of said first corrugations;
said second corrugations positioned in a direction substantially transverse to said first corrugations;
said second corrugations having a size and spacing which permits resilient thermal expansion of said skin construction in a direction along the plane of said metallic skin surface and in a direction transverse to the direction of said second corrugations;
upstanding metallic support members connected to said skin construction; and
said support members including a corrugated upstanding surface,
whereby thermal stresses imposed on said skin construction are absorbed by deformation of said first and second corrugations which each act in a relatively independent manner as expansion joints in providing for controlled expansion of the skin construction without rupture of said imperforate metallic skin surface while thermal stresses imposed on said support members are absorbed by deformation of said corrugated upstanding surface.

22. The combination of claim 21 wherein said support members include
an upper foot defining an attachment surface between the support member and the skin construction, and
a lower foot for attachment of the support member to an underlying structure for support of the skin construction in spaced relation to the underlying structure.

23. The combination of claim 22 wherein
said corrugated upstanding surface defines a closed curved surface.

24. The combination of claim 23 wherein
said closed curved surface is generally circular in cross section.

25. The combination of claim 22 wherein
said corrugated upstanding surface defines an open surface.

26. The combination of claim 21 wherein said upstanding surface includes
means to restrict the flow of heat from said skin construction through said support members.

27. The combination of claim 26 including
a narrowed region in said upstanding surface positioned adjacent said skin construction, and
the heat transfer area of the upstanding surface being reduced at the narrowed region,
whereby the narrowed regions act as a thermal choke in limiting heat flow through the upstanding surface.

28. The combination of claim 26 including
apertures formed in said upstanding surface;
said apertures positioned adjacent said skin construction, and
the heat transfer area of the upstanding surface being reduced at said apertures,
whereby the apertures act as a thermal choke in limiting heat flow through the upstanding surface.

29. The combination of claim 22 wherein
said skin construction is connected to said upper foot at discretely separated points,
whereby movement of said skin construction with respect to the upper foot is permitted at points intermediate the connection points between the skin construction and the upper foot.

30. The combination of claim 21 including
at least two said skin constructions having a smaller area being joined along an edge to form a skin construction of larger area, and
at least one of said support members positioned beneath the jointure between the skin constructions of smaller area with the said support member connected to each of the skin constructions in supporting the constructions and in contributing to the jointure between the skin constructions of smaller area.

31. In combination, a metallic skin construction and support structure suitable for usage as a high temperature airfoil surface with the skin construction positioned in spaced relation to an underlying structure through said support structure, said combination comprising:
a screen having a first set of wires and a second set of wires positioned generally transverse to said first set of wires;
the wires in said first set of wires having an undulating configuration which defines first corrugations and the wires in said second set of wires having an undulating configuration which defines second corrugations;
said first corrugations being positioned generally transverse in respect to said second corrugations;
said wires in said first set being movable with respect to the wires in said second set such that said first and second corrugations are free to expand and contract in a relatively independent manner with respect to each other;
a metallic foil having an imperforate surface;

means joining the foil to the screen at discretely spaced points;

said first corrugations having a size and spacing which permits resilient expansion of said skin construction in a direction along the plane of said metallic skin surface and in a direction transverse to the direction of said first corrugations;

said second corrugations having a size and spacing which permits resilient thermal expansion of said skin construction in a direction along the plane of said metallic skin surface and in a direction transverse to the direction of said second corrugations;

the foil being sufficiently thin to deform without rupturing during relative movement of the foil and screen at intermediate locations between the discretely spaced points;

upstanding metallic support members connected to said skin construction, and said support members including a corrugated upstanding surface, whereby thermal stresses imposed on said skin construction are absorbed by deformation of said first and second corrugations which each act in a relatively independent manner as expansion joints in providing for controlled expansion of the skin construction without rupture of said imperforate metallic skin surface while thermal stresses imposed on said support members are absorbed by deformation of said corrugated upstanding surface.

32. The combination of claim 31 including
a reflective surface on said foil, and
said reflective surface directed outwardly to reject radiant energy impinging on said skin construction.

33. The combination of claim 31 including
a plurality of screens joined to a thin foil in forming a skin construction, and
each of said screens having transversely positioned corrugations.

34. The combination of claim 31 including
a fine mesh outer screen having transversely positioned corrugations defined by the wires forming the outer screen;
a first coarser screen positioned inwardly adjacent the outer screen;
said first coarser screen having transversely positioned corrugations defined by the wires forming the first coarser screen;
a thin metallic foil having an imperforate surface positioned inwardly adjacent the first coarser screen;
a second coarser screen positioned inwardly adjacent the metallic foil;
said second coarser screen having transversely positioned corrugations defined by the wires forming the second coarser screen, and
means joining the outer screen, the first coarser screen, the metallic foil and the second coarser screen to form a composite skin structure.

35. The combination of claim 34 wherein the fine mesh outer screen and first coarser screen are positioned with the lower surfaces defined by the corrugations in the outer screen in contacting relation with the upper surfaces defined by the corrugations in the first coarser screen,
whereby the distance of the heat flow path through the outer screen and the first coarser screen is maximized.

36. The combination of claim 33 wherein the plurality of screens and the metallic foil are joined together by connections which are staggered to provide a lengthened heat flow path through the skin construction.

37. The combination of claim 31 including
a layer of damping material positioned adjacent the metallic foil,
whereby vibration of the skin construction is reduced through absorption of vibrational energy by the damping material.

38. The combination of claim 37 wherein said damping material is metal wool.

39. The combination of claim 31 including
a fine mesh outer screen having transversely positioned corrugations defined by the wires forming the outer screen;
a metallic foil having an imperforate surface positioned inwardly adjacent the outer screen;
a layer of damping material positioned inwardly adjacent the metallic foil;
a coarser screen having transversely positioned corrugations defined by the wires forming the coarser screen;
said coarser screen positioned inwardly adjacent said layer of damping material, and
means joining the outer screen, the metallic foil, the layer of damping material and the coarser screen to form a composite skin construction.

40. The combination of claim 39 wherein the outer screen, the metallic foil, the damping layer and the coarser screen are joined together by connections which are staggered to provide a lengthened heat flow path through the skin construction.

41. In combination, a high temperature skin construction, an underlying structure in spaced relation to the skin construction and a support structure for maintaining the spaced relation between the skin construction and the underlying structure, said combination comprising:
means providing an imperforate metallic skin surface in said skin construction;
means providing first corrugations and second corrugations in said skin construction with said first and second corrugations being free to expand and contract in a relatively independent manner with respect to each other;
said first corrugations having a size and spacing which permits resilient expansion of said skin construction in a direction along the plane of said metallic skin surface and in a direction transverse to the direction of said first corrugations;
said second corrugations positioned in a direction substantially transverse to said first corrugations;
said second corrugations having a size and spacing which permits resilient thermal expansion of said skin construction in a direction along the plane of said metallic skin surface and in a direction transverse to the direction of said second corrugations;
upstanding metallic support members connected to said skin construction;
said support members including a corrugated upstanding surface;
an underlying structure;
said support members connected to said underlying structure to maintain a spaced relation between the skin construction and the underlying structure, and
insulation in the space between the skin construction and the underlying structure, whereby thermal stresses imposed on said skin construction are absorbed by deformation of said first and second corrugations which each act in a relatively independent manner as expansion joints in providing for controlled expansion of the skin construction without rupture of said imperforate metallic skin surface while thermal stresses imposed on said support members are absorbed by deformation of said corrugated upstanding surface.

42. The combination of claim 41 including
means to vent the space between the skin construction and the underlying structure to ambient pressure.

43. The combination of claim 41 wherein said support members include
an upper foot defining an attachment surface between the support member and the skin construction, and
a lower foot for attachment of the support member to the underlying structure in supporting the skin construction in spaced relation to the underlying structure.

44. The combination of claim 43 wherein
said corrugated upstanding surface defines a closed curved surface.

45. The combination of claim 44 wherein
said closed curved surface is generally circular in cross section.

46. The combination of claim 43 wherein
said corrugated upstanding surface defines an open surface.

47. The combination of claim 41 wherein said upstanding surface includes
means to restrict the flow of heat from said skin construction through said support members.

48. The combination of claim 47 including
a narrowed region in said upstanding surface positioned adjacent said skin construction, and
the heat transfer area of the upstanding surface being reduced at the narrowed region,
whereby the narrowed region acts as a thermal choke in limiting heat flow through the upstanding surface.

49. The combination of claim 47 including
apertures formed in said upstanding surface;
said apertures positioned adjacent said skin construction, and
the heat transfer area of the upstanding surface being reduced at said apertures,
whereby the apertures act as a thermal choke in limiting heat flow through the upstanding surface.

50. The combination of claim 43 wherein
said skin construction is connected to said upper foot at discretely separated points,
whereby movement of said skin construction with respect to the upper foot is permitted at points intermediate the connection points between the skin construction and the upper foot.

51. The combination of claim 50 wherein
said lower foot is connected to the underlying structure at discretely separated points,
whereby movement of said lower foot with respect to the underlying structure is permitted at points intermediate the connection points between the lower foot and the underlying structure.

52. The combination of claim 41 including at least two of said skin constructions of a smaller area joined together to form a skin construction of a larger area.

53. The combination of claim 52 wherein the two metallic skin constructions of smaller area are joined together along an edge and including
at least one of said support members positioned beneath the jointure of said skin constructions of smaller area with the support member, thereby, contributing to the support of both of said skin constructions of smaller area.

54. The combination of claim 52 including an overlapping joint between said skin constructions of smaller area.

55. The combination of claim 52 including a compound overlapping joint between said skin constructions of smaller area.

56. The combination of claim 52 including a corrugated overlapping joint between said skin constructions of smaller area.

57. The combination of claim 52 including a bayonet joint between said skin constructions of smaller area.

58. The combination of claim 52 including a flex hinged joint between said skin constructions of smaller area.

59. The combination of claim 41 wherein the spacing between the skin construction and the underlying structure is varied with the variation in the spacing corresponding to the designed temperature difference between the skin construction and the underlying structure.

60. The combination of claim 59 wherein
said skin construction defines an airfoil surface having a leading edge and a trailing edge, and
the distance between the skin construction and the underlying structure being greatest at said leading edge with the spacing diminishing toward said trailing edge.

* * * * *